(12) United States Patent
Schweinfurth et al.

(10) Patent No.: US 11,842,366 B1
(45) Date of Patent: *Dec. 12, 2023

(54) SYSTEMS AND METHODS FOR ACTIVATING ELECTRONIC COUPONS VIA THIRD-PARTY SERVERS

(71) Applicant: WALGREEN CO., Deerfield, IL (US)

(72) Inventors: Andrew Schweinfurth, Chicago, IL (US); Manush Shah, Arlington Heights, IL (US); David Valencia, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/520,271

(22) Filed: Nov. 5, 2021

Related U.S. Application Data

(63) Continuation of application No. 15/588,903, filed on May 8, 2017, now Pat. No. 11,176,567.

(51) Int. Cl.
G06Q 30/02 (2023.01)
G06Q 30/0207 (2023.01)
G06F 16/958 (2019.01)

(52) U.S. Cl.
CPC ....... G06Q 30/0224 (2013.01); G06F 16/972 (2019.01); G06Q 30/0239 (2013.01)

(58) Field of Classification Search
None
See application file for complete search history.

(56) References Cited

U.S. PATENT DOCUMENTS

| | | |
|---|---|---|
| 2002/0004855 A1* | 1/2002 | Cox ............... G06Q 30/02 719/328 |
| 2002/0116271 A1 | 8/2002 | Mankoff |
| 2007/0011050 A1 | 1/2007 | Klopf et al. |
| 2010/0250359 A1 | 9/2010 | Gillenson et al. |
| 2011/0029363 A1 | 2/2011 | Gillenson et al. |
| 2011/0029368 A1 | 2/2011 | Hsu et al. |
| 2011/0047023 A1 | 2/2011 | Lieblang et al. |
| 2011/0106600 A1 | 5/2011 | Malik et al. |
| 2011/0106605 A1 | 5/2011 | Malik et al. |
| 2011/0106606 A1 | 5/2011 | Thordsen et al. |
| 2011/0145057 A1 | 6/2011 | Jones et al. |

(Continued)

OTHER PUBLICATIONS

Best Offer Recommendation Service, Javkar et al., 2016 Intl. Conference on Advances in Computing, Communications and Informatics (ICACCI), Sep. 21-24, 2016, Jaipur, India.*

(Continued)

Primary Examiner — David J Stoltenberg
(74) Attorney, Agent, or Firm — Randall G. Rueth

(57) ABSTRACT

Systems and methods are described for activating electronic coupons via one or more third-party servers. A web-based application programming interface (API) is exposed to a set of online request instructions that are included as part of an electronic coupon configured for electronic transmission from one or more third-party servers of a third party. The web-based API is implemented on an API server hosted by a party different from the third party, and is configured to receive an activation request based on execution of the set of online request instructions by the client device. An electronic coupon is activated for a loyalty profile of a user upon receipt of the activation request.

20 Claims, 5 Drawing Sheets

(56) References Cited

U.S. PATENT DOCUMENTS

| | | | | |
|---|---|---|---|---|
| 2011/0202401 | A1 | 8/2011 | Magadi et al. | |
| 2011/0251880 | A1 | 10/2011 | Butler et al. | |
| 2012/0029998 | A1 | 2/2012 | Aversano et al. | |
| 2012/0030002 | A1 | 2/2012 | Bous et al. | |
| 2012/0101881 | A1* | 4/2012 | Taylor | G06Q 30/04 705/14.36 |
| 2012/0136706 | A1 | 5/2012 | Chang et al. | |
| 2012/0136708 | A1 | 5/2012 | Chang et al. | |
| 2012/0215611 | A1 | 8/2012 | Korson et al. | |
| 2012/0329429 | A1* | 12/2012 | Jabara | G07F 17/3218 455/411 |
| 2013/0030901 | A1 | 1/2013 | Eichstaedt et al. | |
| 2013/0211890 | A1 | 8/2013 | Heitmueller et al. | |
| 2013/0263083 | A1 | 10/2013 | Reddy et al. | |
| 2013/0332253 | A1 | 12/2013 | Shiffert et al. | |
| 2013/0332277 | A1 | 12/2013 | Faith et al. | |
| 2013/0332283 | A1 | 12/2013 | Faith et al. | |
| 2013/0332284 | A1 | 12/2013 | Faith et al. | |
| 2014/0032340 | A1 | 1/2014 | Magadi et al. | |
| 2014/0122207 | A1 | 5/2014 | Christensen | |
| 2014/0136320 | A1* | 5/2014 | Bolan | G06Q 30/0269 705/14.71 |
| 2014/0136321 | A1 | 5/2014 | Bolan et al. | |
| 2014/0164093 | A1* | 6/2014 | Libman | G06Q 30/0277 705/14.39 |
| 2014/0180809 | A1* | 6/2014 | Boal | G06Q 30/0251 705/14.49 |
| 2014/0180810 | A1 | 6/2014 | Boal | |
| 2014/0195314 | A1 | 7/2014 | Ariff et al. | |
| 2014/0297392 | A1 | 10/2014 | Moffitt | |
| 2015/0100443 | A1 | 4/2015 | Van Heerden et al. | |
| 2015/0112774 | A1 | 4/2015 | Georgoff et al. | |
| 2015/0178758 | A1 | 6/2015 | Horowitz et al. | |
| 2015/0220492 | A1 | 8/2015 | Simeonov et al. | |
| 2015/0242883 | A1 | 8/2015 | Setchell et al. | |
| 2015/0254704 | A1 | 9/2015 | Kothe et al. | |
| 2015/0254718 | A9 | 9/2015 | Roberts et al. | |
| 2015/0347969 | A1 | 12/2015 | Davis | |
| 2015/0348111 | A1 | 12/2015 | Davis | |
| 2015/0356589 | A1* | 12/2015 | Jin | G06Q 30/0224 705/14.25 |
| 2015/0371268 | A1 | 12/2015 | Eichstaedt et al. | |
| 2015/0379554 | A1 | 12/2015 | Copeland | |
| 2016/0104228 | A1 | 4/2016 | Sundaresan | |
| 2016/0148241 | A1 | 5/2016 | Walsh et al. | |
| 2016/0179451 | A1 | 6/2016 | Blakely | |
| 2016/0210598 | A1 | 7/2016 | Novick et al. | |
| 2017/0068982 | A1 | 3/2017 | Vangala et al. | |
| 2017/0103408 | A1* | 4/2017 | Mazuera | H04L 63/083 |
| 2017/0116636 | A1 | 4/2017 | Horowitz et al. | |
| 2017/0154358 | A1* | 6/2017 | Cox | H04L 67/04 |
| 2017/0161085 | A1 | 6/2017 | Tobin | |
| 2017/0161728 | A1* | 6/2017 | Satyanarayan | G06Q 20/363 |
| 2017/0308921 | A1 | 10/2017 | Horowitz et al. | |
| 2018/0293628 | A1 | 10/2018 | Magadi et al. | |
| 2018/0336597 | A1 | 11/2018 | Singh et al. | |
| 2020/0034864 | A1 | 1/2020 | Faith et al. | |
| 2020/0082425 | A1 | 3/2020 | Corrieri et al. | |
| 2020/0258112 | A1 | 8/2020 | Horowitz et al. | |

OTHER PUBLICATIONS

Dow et al., "A Location-based Mobile Advertisement Publishing System for Vendors," Eighth International Conference on Information Technology: New Generations (2011).

Enzmann et al., "Improving Customer Retention in E-Commerce through a Secure and Privacy-Enhanced Loyalty System," Information System Frontiers 7:4/5 359-370 (2005).

* cited by examiner

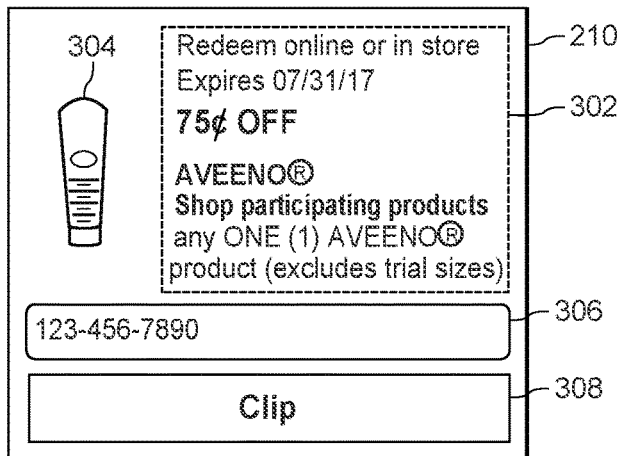
FIG. 3A
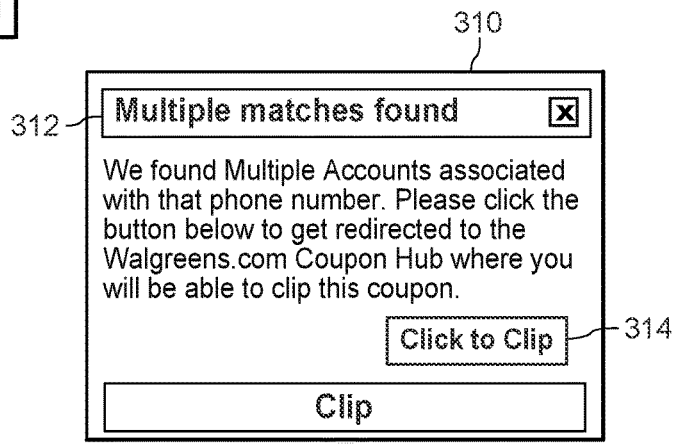
FIG. 3B
FIG. 3C
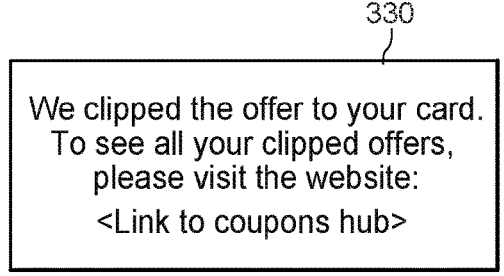
FIG. 3D

SYSTEMS AND METHODS FOR ACTIVATING ELECTRONIC COUPONS VIA THIRD-PARTY SERVERS

RELATED APPLICATIONS

This application claims priority to U.S. application Ser. No. 15/588,903 (filed on May 8, 2017), which is incorporated by reference herein in its entirety.

FIELD OF THE DISCLOSURE

The present disclosure generally relates to online digital offers, and, in particular relates to systems and methods for activating electronic coupons via one or more third-party servers.

BACKGROUND

Digital media advertisers can include business entities, such as wholesalers or retailers of products and services, who leverage digital marketing to deliver promotional advertisements or media to consumers through internet or other online technologies.

Modern-day digital marketing can consist of various online participants, channels, and services, each consisting of, or offering, a plethora of different and varying advertisement or media programmatic platforms to drive consumer purchases, where such platforms are generally hosted on a website associated with the digital marketing advertiser or other market participant. The different and varying advertisement and media programmatic platforms, however, can be difficult for digital media advertisers or other market participants to maintain or manage, especially where such market participants are responsible for maintaining or managing source code, digital images, media, or other resources or information necessary for display or execution of online advertisements or promotions on a website, and where each of the programmatic platforms often have different requirements for use.

In addition, many current digital marketing solutions depend on client-side storage and tracking functionality, such as the use of computer cookies to store online user selections and browsing behavior. Such client-side storage and tracking can be rendered useless if the user turns off cookie, or other client-side storage and tracking features, in the user's web browser or similar web capable application.

BRIEF SUMMARY

Accordingly, there is a need for systems and methods that can overcome the aforementioned issues, and provide digital media advertisers, or other market participants, with a streamlined approach to implement a comprehensive digital marketing strategy and platform, and without the use or dependence on limiting client-side storage and tracking functionality.

The disclosed systems and methods enable digital media advertisers, or other market participants, to associate a consumer anonymously through a digital media advertisement platform, such as an electronic coupon system, where a user can activate, or clip, a digital offer, such as an electronic coupon, to the user's loyalty profile or account. A user's loyalty profile or account can be related to a loyalty or reward program, such as a reward card program, of a retailer, wholesaler, or other market participant.

The disclosed systems and methods allow consumers to activate digital offers, such as electronic coupons, with their loyalty profiles using webpages or other online applications that are hosted by third-parties and that may be outside of a retailer's or wholesaler's website or other ecosystem controlled by the retailer or wholesaler. This allows retailers or wholesalers to increase their digital customer user bases through unique marketing channels offered by third-party market participants by using the electronic coupon service for specific marketing channels offered by the third-party market participants, for example, through specific online publishers, such as online newspapers, media, or other websites that consumers of particular demographics regularly visit. The electronic couponing systems and methods disclosed herein can be particularly valuable to a retailer or wholesaler because consumers who interact with the retailer or wholesaler via digital means, including via electronic couponing, typically spend several times more with the retailer or wholesaler than they do by just visiting a store operated by the retailer or wholesaler alone.

Accordingly, in various embodiments disclosed herein, systems and methods are described for activating electronic coupons via one or more third-party servers. The electronic coupon systems and methods may use one or more processors to receive, as part of a request across a computer network, a profile identifier (ID) associated with a loyalty profile of a first user. The profile ID may be any ID that uniquely identifies the first user within the electronic couponing system and methods, and may include, for example, any of a phone number, an email address, a social security number, or a user name.

The request may originate from a client device using request instructions provided from one or more third-party servers. The profile ID may also be associated with an electronic loyalty program of a second party, such as a retailer or other digital media advertiser who is offering a product or service associated with an electronic coupon. For example, the electronic coupon may be associated with a product or service offered by a retailer, where the electronic coupon may be used by the first user to purchase the product or service at a discount.

The request may cause the electronic coupon system to activate the electronic coupon for the loyalty profile of the first user. The electronic coupon may be provided by the same or separate third-party, including, for example, provided by a server associated with the same or separate third-party, to the client device for display on the client device. In some embodiments, the request instructions may cause the client device to access an application programming interface (API) of a loyalty server associated with the second party in order to activate the electronic coupon. In further embodiments, the loyalty server's API may expose a recommendation interface that is operable to transmit, across a computer network, one or more recommendations for electronic coupons.

In various embodiments, the one or more third-party servers may include a digital media advertiser server associated with a digital media advertiser, such as a wholesaler of a particular product or service. The one or more third-party servers may also include a demand side platform (DSP) server associated with a party offering demand side platform services, such as Google offering the DSP Google Ad services. The one or more third-party servers may also include a publisher server associated with a publisher party such as newspaper hosting an online media or newspaper website or other party hosting any other consumer facing website.

In some embodiments, the request instructions used to activate an electronic coupon may be associated with the electronic coupon displayed on the client device. For example, in several embodiments, the request instructions and the electronic coupon may be provided from a digital media advertiser to a DSP server. In such embodiments, the publisher server can accesses the request instructions and electronic coupon from the DSP server and display, using display instructions, the electronic coupon on the client device such that the request instructions are available for use with the client device.

In another embodiment, the electronic coupon system may transmit a loyalty account status of the first user to the client device upon receiving a request from the client device, where the loyalty account status can indicate a number of accounts associated the loyalty profile of the first user. The electronic coupon system may then receive a detailed indication from the client device indicating the account of the loyalty profile of the first user to use for activation of the electronic coupon.

In additional embodiments, a tangible, non-transitory computer-readable medium may store request instructions for activating electronic coupons, such that when the request instructions are executed by one or more processors of a client device, the client device may transmit, as part of a request across a computer network, a profile identifier (ID) associated with a loyalty profile of a first user. The profile ID may be any ID used to uniquely identify a user as described herein. The request may originate from the client device using the request instructions as originally provided from one or more third-party servers.

The profile ID may also be associated with an electronic loyalty program of a second party. As a result of the request, the client device may receive an indication as to whether an electronic coupon for the loyalty profile of the first user was activated. In some embodiments, the electronic coupon can be provided from the one or more third-party servers to the client device for display on the client device.

In other embodiments, the request instructions may further include instructions for the client device to request, across the computer network, a loyalty account status of the first user from a loyalty server of the second party, the loyalty account status indicating a number of accounts associated with the loyalty profile of the first user. The client device may transmit a detailed indication indicating a particular account of the loyalty profile to use for activation of the electronic coupon.

In still further embodiments, the request instructions may further include instructions for the client device to receive a webpage displaying one or more activated electronic coupons for the first user.

In still further embodiments, an electronic coupon system for activating electronic coupons via one or more third-party servers is described. A web-based application programming interface (API) is exposed to a set of online request instructions. The set of online request instructions may be included as part of an electronic coupon configured for electronic transmission from one or more third-party servers of a third party. The online request instructions may comprise client-based code configured to run or execute on any number of operating systems or platforms of a client device. The online request instructions may be further configured to directly access the exposed web-based API via a computer network. The electronic coupon system may comprise an API server hosted by a party different from the third party. The API server may implement the web-based API to receive an activation request based on execution of the set of online request instructions by the client device. A computer memory may be communicatively coupled to the API server. The electronic coupon system may further include a memory that stores a loyalty profile of a first user. The loyalty profile may be stored as part of a loyalty program of the party. The API server may be configured to activate an electronic coupon for the loyalty profile of the first user upon receipt of the activation request.

In additional embodiments, an electronic coupon method for activating electronic coupons via one or more third-party servers is disclosed. The electronic coupon method may comprise exposing a web-based application programming interface (API) to a set of online request instructions. The set of online request instructions may be included as part of an electronic coupon configured for electronic transmission from one or more third-party servers of a third party. The online request instructions may comprise client-based code configured to run or execute on any number of operating systems or platforms of a client device. The online request instruction may further be configured to directly access the exposed web-based API via a computer network. The electronic coupon method may further comprise implementing the web-based API on an API server hosted by a party different from the third party. The API server may be configured to receive an activation request based on execution of the set of online request instructions by the client device. The electronic coupon method may further comprise storing a loyalty profile of a first user in a computer memory. The computer memory may be communicatively coupled to the API server. The loyalty profile may be stored as part of a loyalty program of the party. The electronic coupon method may further comprise activating an electronic coupon for the loyalty profile of the first user upon receipt of the activation request.

In still further embodiments, a tangible, non-transitory computer-readable medium storing request instructions for activating electronic coupons is disclosed. The instructions, when executed by one or more processors of a client device, may cause the client device to transmit a request across a computer network. The request may originate from a client device of a first user. The request may include a set of online request instructions provided from one or more third-party servers of a third party. The set of online request instructions may be included as part of an electronic coupon configured for electronic transmission from the one or more third-party servers of a third party. In addition, the online request instructions may comprise client-based code configured to run or execute on any number of operating systems or platforms of a client device. The online request instructions may further be configured to directly access an exposed web-based Application Programming Interface (API). The set of online request instructions may be transmitted to the exposed web-based API. The web-based API may be implemented on an API server hosted by a party different from the third party. The API server may be configured to receive an activation request based on execution of the set of online request instructions by the client device. The API server may be communicatively coupled to a computer memory, where the computer memory stores a loyalty profile of the first user as part of a loyalty program of the party. The API server may be configured to activate an electronic coupon for the loyalty profile of the first user upon receipt of the activation request.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIGS. 3A, 3B, 3C, and 3D illustrate exemplary media, including text, graphics, input elements, and messages, for the electronic coupon of FIG. 2.

The Figures depict preferred embodiments for purposes of illustration only. Alternative embodiments of the systems and methods illustrated herein may be employed without departing from the principles of the invention described herein.

DETAILED DESCRIPTION

Figure 1:
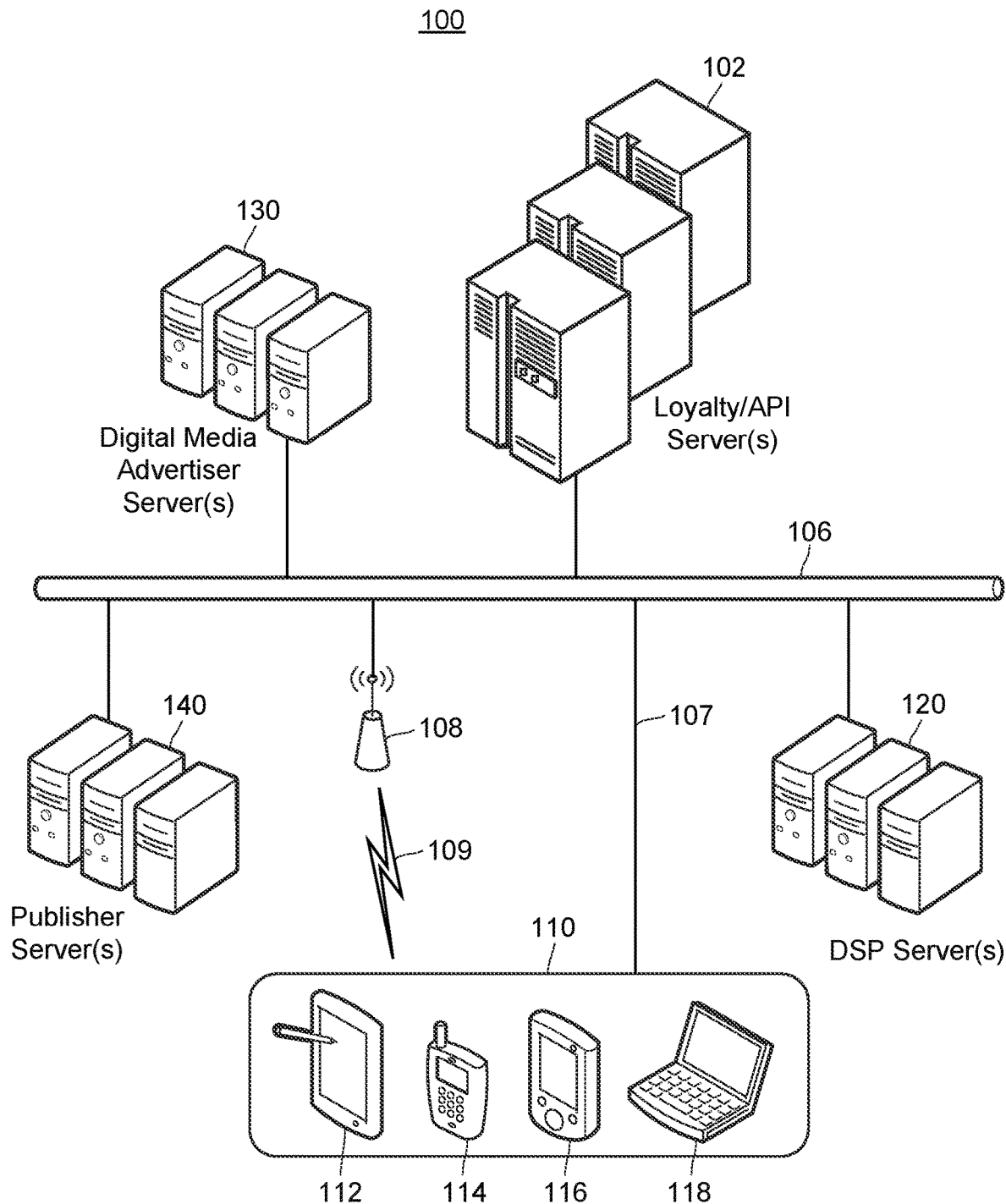
FIG. 1 illustrates an exemplary computer network diagram in accordance with embodiments for the disclosed electronic coupon systems and methods.

FIG. 1 illustrates an exemplary computer network diagram 100 in accordance with embodiments for the disclosed electronic coupon systems and methods. In various embodiments, a user may use any number of client devices 110 to communicate with servers, such as server(s) 102, 120, 130, and 140, over computer network 106, as described herein. Client devices 110 can include any computing device, such tablet device 112, mobile phone 114, smart phone 116, or computer 118, which can include a laptop computer, personal computer, or other such computing device. Each of the client devices 110 may include one or more processors, one or more computer memories, and one or more network interface devices (wired or wireless) for communication via computer network 106. The client devices 110 may also run or execute any number of operating systems or platforms including, for example, Apple iOS, Microsoft Windows, Google Android, or other such operating systems or platforms. The operating systems may be capable of running or executing a number of different web browsers or other online browser applications, for example, Google Chrome, Microsoft Internet Explorer, Apple Safari, Firefox, or any other online software or browser used to request, receive and/or execute online instructions, including via Hyper Text Markup Language (HTML), JavaScript, Cascading Style Sheet (CSS), or other instructions for displaying or executing online webpages or applications in communication with online servers or websites.

In various embodiments, a client device 110 may be connected to computer network 106 via a wired connection 107 or wireless connection 109. In one embodiment, for example, the wired connection 107 may include a Category 5 (Cat 5) cable connected to a router device (not shown) using the Ethernet protocol to transmit computer packet data over the computer network 106.

In another embodiment, wireless connection 109 may wireless communication via the WiFi (e.g., IEEE 802.11) or Bluetooth communication standards, where a compatible wireless transceiver of a client device 110 communicates with a base station 108 (e.g., a wireless router) for transmission and receipt of data via computer network 106. In another embodiment, the wireless connection 109 is a cellular phone or mobile connection using 2G (e.g., GSM, D-AMPS, PDC), 3G (e.g., UMTS, WCDMA, EvDO), or 4G (e.g., OFDMA, LTE, etc.) mobile or cellular standards, where a compatible wireless transceiver of a client device 110 communicates with a base station 108 (e.g., a cellular tower) for transmission and receipt of data via computer network 106.

In various embodiments, client devices 110 may communicate with computer servers, such as server(s) 102, 120, 130, or 140 via computer network 106, in order to receive, display, and activate electronic coupons as described herein. Server(s) 102, 120, 130, or 140 may include one or more processors, computer memories, and/or transceivers for processing, executing, storing instructions, or data related to the electronic coupons. For example, in one embodiment, a user of a client device 110 may visit a website, such as a publisher website hosted on one or more publisher server(s) 140, where the website sends the client device 110 a webpage that uses the electronic coupon service as described herein. In the present embodiment, the user could view an electronic coupon on the client device, which could include, for example, an advertisement for a particular product or service. The user would then be able to link, or activate, the electronic coupon to his or her loyalty profile by providing a profile identifier, such as a phone number, that is tied to the user's loyalty profile or account. In various embodiments described herein, the electronic coupons may be referred to as "clipped" to a user's loyalty profile when the electronic coupon is activated for, or stored for, the user's loyalty profile. In some embodiments, the loyalty profile can be associated with a rewards program, such as a rewards card or other loyalty card program of a retailer or other merchant, where the user can receive rewards, discounts, or other incentives for clipping the electronic coupon.

In various embodiments, one or more servers, such as loyalty server(s) 102, may store a user's profile, including a user's loyalty profile. The loyalty server(s) 102 may be hosted by a retailer or other merchant associated with a rewards card or other loyalty card program. The loyalty server(s) 102 may activate electronic coupons clipped by the user using a client device 110 as described herein, for example, by associating the electronic coupon with the user's rewards card. The loyalty server(s) 102 may process or execute incoming requests, for example, from a client device 110, using a number of web server technologies or frameworks, including Java Server Pages (JSP), Microsoft Active Server Pages (ASP.NET), Ruby, PHP, etc.

Loyalty server(s) 102 can also expose an application programming interface (API) that provides several web services. The web API enables remote applications, such as an application on a client device 110, or a third-party application or website hosted on third-party servers 120, 130, or 140, to search and clip digital coupons directly to a user's loyalty profile. The third-party servers, as the term is used herein, may relate to one or more entities or operators of the various servers described herein. For example, in one embodiment, loyalty/API server(s) 102, digital media advertiser server(s) 130, and/or publisher server(s) 140 may be owned and operated by the same entity, such as an online publisher or retailer. In another embodiment, each of servers 102, 130, and/or 140 may be operated by separate entities, such as a separate retailer, separate digital media advertiser, and separate publisher, each independently operating servers 102, 130, and 140, respectively. It will be appreciated that other ownership and/or operation schemes are also possible, where, for example, an entity operates two of the servers, such as loyalty server(s) 102 and publisher server(s) 140, and another entity operates the other servers, including digital media advertiser server(s) 130 and/or DSP server(s) 120, or other combinations thereof.

In some embodiments, the API web services can be accessed by the client device 110. In other embodiments the web API can expose various methods, functions, or responses accessible across the computer network 106, for access by third-parties, including the third-party servers (e.g., 102, 120, and/or 130, as described herein). The API may expose methods and functions for receiving requests and may also provide responses via a Representational state transfer (RESTful) web service or may provide traditional web based functionality, where the API responds with HTML-based responses. The loyalty server(s) 102 may receive requests or provide responses in various formats, including JavaScript, HTML, Extensible Markup Language (XML), JavaScript Object Notation (JSON), or any other similar data formats.

In one embodiment, for example, the web API may provide a Request Loyalty Member Lookup service. The Request Loyalty Member Lookup service may be used to fetch a user's profile ID, which, in some embodiments, may be a unique identification number associated with a user and used for that user's requests associated with clipping an electronic coupon to the user's loyalty profile. In some embodiments, if the user's loyalty profile cannot be found for a given profile ID, the electronic coupon, as displayed on a webpage on the client device 110, could redirect the user to a coupon webpage. In another embodiment, the if the user's loyalty profile cannot be found for a given profile ID, the electronic coupon, as displayed on a webpage on the client device 110, could ask the user whether the user would like to sign up for a loyalty program, such as a rewards card program.

In another embodiment, for example, the web API may provide a Request Get Recommended Offers service, which may be used to fetch a dynamically ranked set of recommended electronic coupons for a given user. This service can be used for both anonymous and registered users, where registered users may be those users with a profile ID and associated loyalty profile on loyalty server(s) 102, as described herein. In some embodiments, the electronic coupons may be returned in a list data format, e.g., formatted in JSON, the list containing one or more electronic coupons for display on webpage that the user is viewing. The webpage may display one or more of the electronic coupons in the list.

In another embodiment, for example, the web API may provide a Request Activate Offer service, which may be used to activate or de-activate a particular electronic coupon for a given user. For example, the Request Activate Offer service may be accessed when a user, using a client device 110, requests that an electronic coupon be clipped to the user's loyalty profile. In some embodiments, the Request Activate Offer service may return an indication that the electronic coupon has been successfully activated. In some embodiments, once an electronic coupon is clipped to a customer's loyalty profile, the electronic coupon could be automatically applied the next time the user purchases the good or service associated with the electronic coupon, such as when the user purchases the good or service at a retailer's website or store that recognizes the user's loyalty profile or loyalty reward program.

In another embodiment, for example, the web API may provide a Request Get Activated Offers, which may be used to retrieve all electronic coupons associated with the user. In some embodiments, this service can retrieve all user activated electronic coupons that are live on the loyalty server(s) 102, have not expired, and have not been already redeemed by the user.

As described herein, a webpage displayed by a client device 110 may include electronic coupons, where, in various embodiments, the determination of what electronic coupon to display on a webpage for a given user may be made based on the interaction among various servers (e.g., servers 102, 120, 130, and/or 140) via computer network 106. For example, one or more publisher server(s) 140 may be servers connected to computer network 106 and that are owned by, operated by, or associated with one or more third-parties including, for example, the Chicago Sun-Times, the Wall Street Journal, or any other online media publisher, or other internet website, such as an online retailer including Amazon, Macy's, etc. In various embodiments disclosed herein, the publisher server(s) 140 may host one or more websites that provide webpages, for example, HTML-based webpages, that are displayed on the a user's client device 110. As described herein (for example, with respect to FIG. 2) the publisher webpages may include areas of the page, such as tiles or banners, reserved for the placement of the electronic coupons or other advertisements or media. In various embodiments, an electronic coupon may be displayed in a tile, or other area of the webpage, where the electronic coupon is provided to the publisher server from a demand side platform (DSP). In one embodiment, the DSP may also provide with, or as part of, the electronic coupon a set of request instructions such that the request instructions may also be included as part of the webpage displayed by the client device 110. In various embodiments, the request instructions are executed on the client device 110 when a user selects to activate or clip an electronic coupon such that the electronic coupon becomes associated with the user's loyalty profile. The request instructions may include code, such as JavaScript code, that executes on the client device 110 and that makes a request to, and receives a response from, the web API on the loyalty server(s) 102 in order to carry out various functions, such as retrieving a user's profile ID, getting recommendations for electronic coupons, activating electronic coupons, or otherwise as described herein.

Digital media advertiser server(s) 130 may be associated with a digital media advertiser promoting a particular product or service, such as Johnson & Johnson Consumer, Inc. promoting a skin care lotion product, Aveeno®. Although the specific example of Aveeno® is recited herein, it is to be understood that the specific example can apply to a broader set of products or services that may be offered via an online webpage, website or other online application according to the various embodiments disclosed herein. In several embodiments, the digital media advertisers can create the electronic coupons for display on the publisher server(s) 140. An electronic coupon typically includes text and graphics for display to users, such as text and graphics used to create an advertisement or other graphic promotional for the related product or service. In some embodiments, the electronic coupons include software or code, such as request instructions, that enable a client device 110 to execute functions, such as requesting web API on loyalty server(s) 102, to clip the electronic coupon to a user's loyalty profile. The request instructions may be implemented in any form of client-based code, including, for example, JavaScript, HTML, CSS, or related technologies.

The digital media advertiser server(s) 130 may store various images, videos, text, descriptions or other media to be used for creation or generation of the electronic coupons. For example, in one embodiment, images, videos, text, or descriptions, such as an image and description of the Aveeno® product, stored on a digital media advertiser server(s) 130, may be incorporated into an electronic coupon as part of the electronic coupon. In another embodiment, the images, videos, text, or descriptions of the digital media advertiser server(s) 130 may be referenced by code in the electronic coupon to link to back to the digital media advertiser server(s) 130 for retrieval of the images, videos, text, or descriptions for creation of the electronic coupon on the webpage of the publisher server(s) 140. In other embodiments, images, videos, text, descriptions referenced in an electronic coupon may link back to the publisher server(s) 140, or other server(s) described herein.

In various embodiments, digital media advertisers may create electronic coupons that include code that uses or references the web API exposed by the loyalty server(s) 102. Such electronic coupons may be used to clip the electronic coupons to a user's account. In various embodiments, the digital media advertisers submit the created electronic coupons to one or more demand side platform DSP server(s) 120. Typically, demand side platforms are hosted by third-parties. An example of a demand side platform includes Google Ads services. DSPs are typically used by digital media advertisers, or other ad agencies, to assist with the purchase, display, and dissemination of advertisements. A DSP can be used by a digital media advertiser to place the electronic coupons on a publisher's webpage. For example, a digital media advertiser associated with digital media advertiser server(s) 130 can use the DSP hosted by server(s) 120 to place digital ads on publisher's website as hosted on publisher server(s) 140.

DSPs generally operate by allowing allow digital media advertisers to buy advertisements, ad impressions, or, as described herein, electronic coupons, across a range of publisher sites, and also target specific users based on information such as their age, location, and/or their previous browsing behavior. Using marketplaces called ad exchanges, publishers, such as the publishers associated with publisher server(s) 140, can announce and list that ad space is available on their websites for the display of the advertisements, or electronic coupons, of digital media adversities to end users. DSPs can decide, using automatic software executing on DSP servers (e.g., servers 120), which of the advertisements or electronic coupons makes the most sense (e.g., based on the publisher's typical demographic visitor) for a digital media advertiser to buy for placement on the publisher's website. The price of the advertisements or electronic coupons may be determined by a real-time auction, through a process known as real-time bidding, where competing advertisements and electronic coupons are simply auctioned off to the highest digital media advertiser bidder. Typically, the process takes place quickly, often in a matter of milliseconds, as a user's client device 110 loads the publisher's webpage, for example, as served from publisher server(s) 140.

In some embodiments, a DSP, via DSP server(s) 120, may also allow the digital media advertisers to buy, serve and track their electronic coupons and/or other advertisements using an online tool hosted by DSP server(s) 120, which can allow the digital media advertisers to optimize advertising campaigns more easily as a result.

Figure 2:
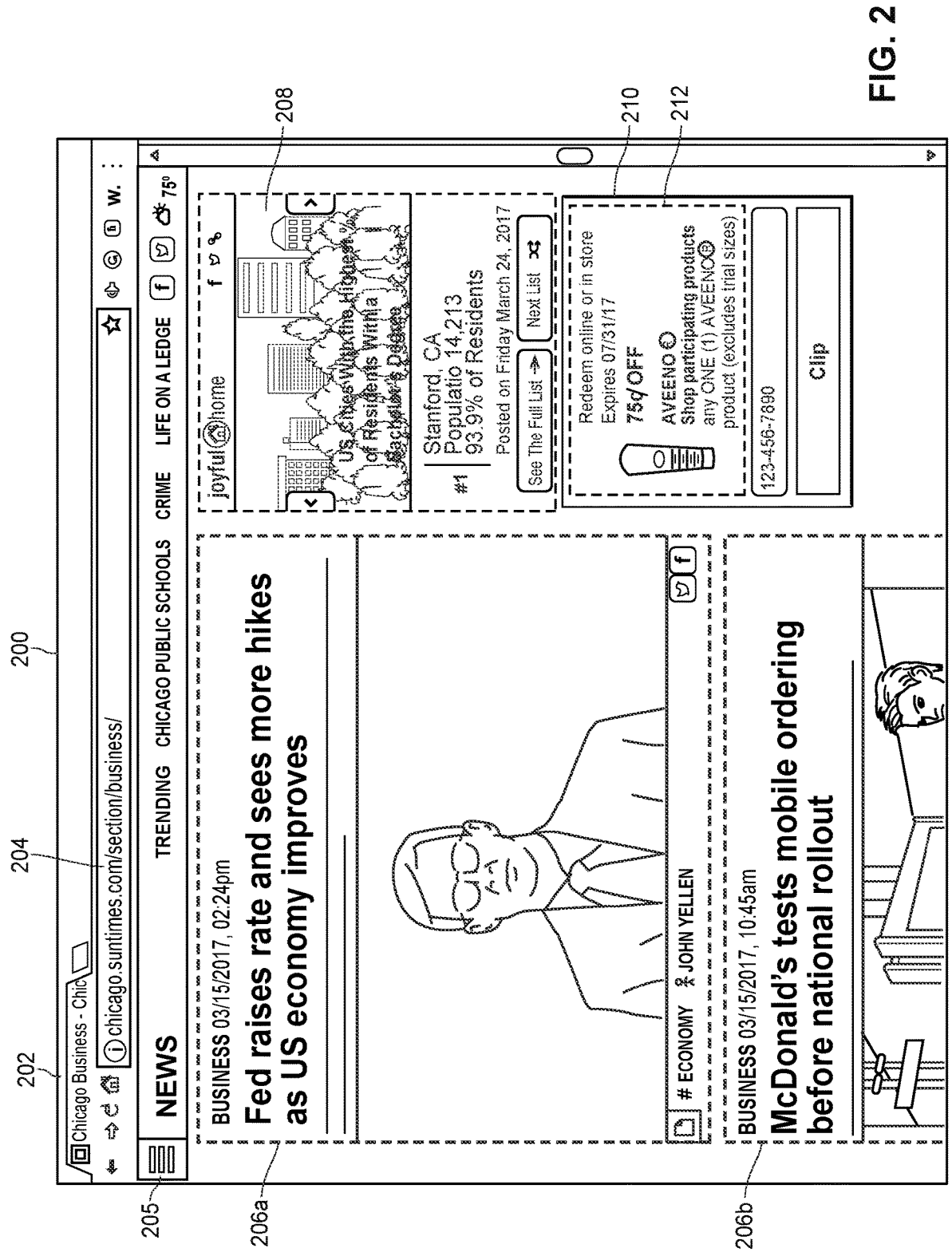
FIG. 2 illustrates an exemplary webpage displaying an embodiment of an electronic coupon.

FIG. 2 illustrates an exemplary webpage 202 displaying an embodiment of an electronic coupon 210. In some embodiments, as depicted in FIG. 2, the webpage 202 may be displayed in a web browser 200, such as Chrome, Firefox, Safari, Internet Explorer or other web browser. In other embodiments, the webpage 202 or electronic coupon 210 may be displayed in a mobile application (not shown), such as a mobile application implemented via the Apple iOS, Google Android, or Amazon Fire OS platforms. In some embodiments, the web browser or mobile application may be executed on a client device 110 of the user as described herein.

As depicted in the embodiment of FIG. 2, webpage 202 depicts a webpage hosted by a publisher and directed to Chicago Business, which is reflected in the Uniform Resource Locator (URL) displayed in the address bar 204 of the web browser 200. In the present embodiment, the publisher may be a third-party publisher that hosts webpage 202 on publisher server(s) 140.

The webpage 202 includes a title bar 205 with a description of the webpage ("NEWS") and several news stories 206a ("Fed raises rate and sees more hikes as US economy improves") and 206b ("McDonald's tests mobile ordering before national rollout") on the left side of the webpage 202. In embodiments where webpage 202 is executed on a web browser, webpage 202 may be implemented as an HTML webpage that may include JavaScript, CSS, or other web languages and technologies, for arranging the various elements, such as the title bar 205, news stories 206a and 206b, advertisement 208, and electronic coupon 210 on a display screen, for example, a display screen of a client device 110. In embodiment where webpage 202 is executed as a mobile application (not shown), then the webpage (or related screen) may be implemented using the native code for the underlying mobile operating system, such as Objective-C or Swift for Apple iOS or Java for Google Android.

Webpage 202 also includes areas for electronic advertisements, for example, advertisement 208, which is displayed in tile area of webpage 202. Such advertisement may or may not be placed on webpage 202 via a DSP. For example, in one embodiment, the advertisement 208 may be sourced directly from the publisher server(s) 140 when webpage 202 loads, such that the graphics, text, and related code, for example, code for execution of the "See the Full List" or "Next List" buttons are stored and retrieved from publisher server(s) 140 when the webpage 202 is generated. In other embodiments, parts of, or the entirety of, advertisement 208 may be retrieved from a DSP when the webpage 202 is loaded on the user's client device 110. For example, in such embodiments, the publisher may send the client device 110 a webpage with an initially blank tile area defined, for example, by an HTML <iframe> element, that advertisement 208 will eventually occupy on webpage 202. For example, when webpage 202 loads on the client device 110, the web browser 200 executes a script for the blank tile that causes the client device 110 to access the DSP server(s) 120 for retrieval of advertisement 208. The DSP server(s) 120 may perform an electronic auction, where the digital media advertiser who created, or is otherwise associated with, electronic coupon 210 successfully outbids other advertisers for placement of their advertisements, thus, causing the DSP server(s) to send the advertisement 208 to the client device 110 for display on webpage 202. The process of accessing the DSP, performing the auction, and loading the advertisement 208 into the webpage 202 may occur quickly, such as at the same time that the webpage 202 is loading, and where the user is unaware that access to the third-party DSP server(s) 120 has occurred.

In the embodiment of FIG. 2, webpage 202 also includes electronic coupon 210, which is displayed in a tiled area on the right side of webpage 202. In some embodiments, however, the electronic coupon 210 may be displayed in other fashions, such as a banner at the top or bottom of the page, as text, or as any other arrangement or display on a webpage or screen of a client device 110. As described herein, electronic coupon 210 may include media, including text, graphics, video, or other media, such as shown for media 212, which, in the present embodiment, depicts an advertisement for the Aveeno® skin care lotion product, which may be offered from Johnson & Johnson Consumer Inc., as the digital media advertiser. In other embodiments, the product may be offered by a retailer Aveeno® skin care lotion product.

As described for advertisement 208, electronic coupon 210 may be similarly placed on the webpage by a DSP. For example, parts of, or the entirety of, electronic coupon 210 may be retrieved from a DSP when the webpage 202 is loaded on the user's client device 110. For example, in such embodiments, the publisher server(s) 140, may send the client device 110 a webpage with an initially blank tile area defined, for example, by an HTML <iframe> element, that the electronic coupon 210 will eventually occupy on webpage 202. For example, when webpage 202 loads on the client device 110, the web browser 200 executes a script for the blank tile that causes the client device to access the DSP server(s) 120 for retrieval of electronic coupon 210. The DSP server(s) 120 may perform an electronic auction, where the digital media advertiser who creates, or is otherwise associated with, electronic coupon 210 successfully outbids other advertisers for placement of their advertisements, thus, causing the DSP server(s) 120 to send the electronic coupon 210 to the client device 110 for display on webpage 202.

For creation of the electronic coupon 210, any of the publisher server(s) 140, digital media advertiser server(s) 130, or the DSP server(s) 120 may access the web API at the loyalty server(s) 102 to prepare the electronic coupon 210. For example, in one embodiment, the digital media advertiser server(s) 130 or the DSP server(s) 120 may access the web API on the loyalty server(s) 102 to retrieve recommendations of which electronic coupon to display for a particular user as described herein. The process of accessing the DSP, performing the auction, and loading the electronic coupon 210 into the webpage 202 may occur quickly, such as at the same time that the webpage 202 is loading, such that the user is unaware that access to any third-party server(s) has occurred.

As described herein, the electronic coupon 210 may include code, such as request instructions, used to activate the electronic coupon with a user's loyalty account. For example, a user can enter his or her profile ID (e.g., a phone number) into the text box of electronic coupon 210, and then select the "Clip" button. Request instructions, such as JavaScript code, associated with the electronic coupon 210, and executing client device 110, may then send an activation request to the web API of loyalty server(s) 102 causing the loyalty server(s) 102 to clip the electronic coupon 210 to the user's loyalty profile, such as a balance reward program of a second party, e.g., a wholesaler or retailer of the Aveeno® skin care lotion product.

In certain embodiments, because the electronic coupon 210 can operate using the web API of the loyalty server(s) 102, the electronic coupon 210 does not need to rely on any background program or storage scheme (e.g., cookies) on a client device 110 for the purpose of storing, tracking or activating a user's electronic coupons. For example, cookies are typically small files which are stored on a user's client device by the user's web browser. The cookie files are generally related to a particular client device and website, and can be accessed by the website for tracking the client, or for retrieving other information about the client, such as when the user uses his or her web browser. Cookies, however, are not needed for some embodiments, where, for example, a user can interact with an electronic coupon, such as electronic coupon 210, on publisher website hosted on server(s) 140, and identify himself or herself with a profile ID as describe herein. In such an embodiment, the profile ID is communicated to loyalty server(s) 102 and used to track, store, or activate user selections of electronic coupons. Thus, in the present embodiment, the loyalty server is able to track and store a user's activity without the use of traditional cookies as typically used for web browsers.

In other embodiments, however, the electronic coupon systems and methods may make use of background programs or storage functionality offered by web browsers (e.g., cookies), for example, to enhance the user's experience.

FIGS. 3A, 3B, 3C, and 3D illustrate exemplary media, including text, graphics, input elements, and messages, for the electronic coupon 210 of FIG. 2. FIG. 3A shows the electronic coupon 210 of FIG. 2. The layout of the media, text, graphics, or input elements may be implemented via CSS and HTML code, including, for example, any of table, div, span, or related layout code for arranging the elements 302, 304, 306, and 308, as provided with the electronic coupon 210. As described for FIG. 2, electronic coupon 210 may include, or link to, such media, such as text media 302 describing a particular advertisement or digital offer for an Aveeno® skin care lotion product. Electronic coupon 210 may also include, or link to, image media, such as image media 304 for the Aveeno® skin care lotion product.

Electronic coupon 210 may also include an input element, such as input text box 306, which allows a user, using a client device 110, to input his or her profile ID. In the embodiment of FIG. 3A, the profile ID is a phone number, although other alphanumeric or other character data may be entered for the profile ID, including a proprietary customer number, an address, a social security number, a customer name, or other information that uniquely identifies the customer. The text box 306 may be implemented as a HTML input text form field, although other HTML input types or other code types may be used.

Electronic coupon 210 may also include a submit element, such as button 308. The submit element can cause a client device, such as a client device 110, to execute request instructions of the electronic coupon 210. For example, in one embodiment, when a user presses the "submit button 308, the request instructions may cause a client device 110 to activate, or "clip," electronic coupon 210 with the user's loyalty program. In one embodiment, for example, a user may press submit button 308 that causes a user's client device 110 to execute request instructions that send a request, that includes the user's profile ID, across computer network 106 to the web API of loyalty server(s) 102. The request may be made to the Request Activate Offer service, as described herein, which may be used to activate electronic coupon 210 for the user using the user's profile ID to clip the electronic coupon 210 to the user's loyalty profile.

The request instructions may be code, such as JavaScript code, included with, or linked from, an electronic coupon. For example, JavaScript code that has been included as part of the electronic coupon 210 may executed when the user selects submit button 308. In another embodiment, JavaScript code that is linked from another server, such as loyalty server(s) 102, digital media advertiser server(s) 130, or other server(s) described herein, and that is downloaded to the client device separate from the electronic coupon 210, may be executed when the user selects button 308.

FIG. 3B depicts an embodiment of a display message 310 that may be displayed by a client device 110. The message 310 may be displayed in response to a user selecting button 308 of FIG. 3A, where message 310 and message title 312 indicates that, as a result of the request, multiple accounts associated with the user's loyalty profile have been found on loyalty server(s) 102. The message 310 may be displayed on the screen of client device 110, including in the same tile area as electronic coupon 210. In the present embodiment, the message 310 indicates that selecting the "Click" to Clip" button 314 will redirect the user to a retailer webpage, in this case Walgreens.com, where the user would be able to clip the electronic coupon at the retailer webpage using the electronic coupon systems and methods as described herein.

FIG. 3C depicts an alternative embodiment to FIG. 3B, where the user is able to indicate a specific account to use for clipping the electronic coupon and without being redirected to another webpage. For example, in FIG. 3C, the user receives input message 320 indicating that, as a result of the request, multiple accounts associated with the user's loyalty profile have been found. The input message 320 may be displayed on the screen of client device 110, including in the same tile area as electronic coupon 210. Input message 320 requests that the user identify a specific loyalty account by providing account specific information, including phone number information into phone number text box 322, zip code information into zipcode text box 324, and first name information into firstname text box 326. The specific information may be then transmitted in a second request to activate the electronic coupon 210 for the user's loyalty profile and for the particular indicated account. While FIG. 3C depicts user specific information including, phone number, zip code, and first name, other user specific information may be used.

FIG. 3D depicts an embodiment of an indicator message 330 that indicates that electronic coupon 210 has been successfully clipped to the user's loyalty profile, which, in some embodiments, can include a rewards card program as indicated in indicator message 330. For example, indicator message 330 may be received in response to a user selecting button 308 from electronic coupon 210, where the client device executing request instructions for electronic coupon 210 causes a request, including the user's profile ID, to be sent to the web API on loyalty server(s) 102, as described herein. The indicator message 330 may be displayed on the screen of client device 110, including in the same tile area as electronic coupon 210. In some embodiments, the indicator message 330 may include a link to the website of the provider of the loyalty program, as depicted in the indicator message 330, which may be used by the user to display a list of his or her currently clipped electronic coupons.

Figure 4:
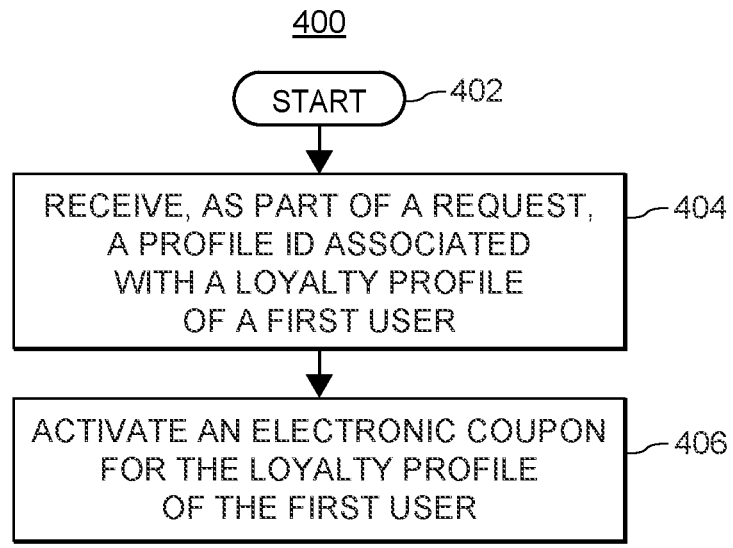
FIG. 4 illustrates a flow diagram of an exemplary method for activating electronic coupons via one or more third-party servers.

FIG. 4 illustrates a flow diagram of an exemplary method 400 for activating electronic coupons via one or more third-party servers. In one embodiment, method 400 is implemented on loyalty server(s) 102 of FIG. 1, although, method 400 may be implemented on one or more of the server(s) described herein, such as any of server(s) 120, 130, or 140. Method 400 may begin (402) at block 404 where the loyalty server(s) 102 receive, as part of a request across a computer network 106, a profile identifier (ID) associated with a loyalty profile of a first user. As described herein, the profile ID may be any ID that uniquely identifies a user within the electronic couponing system and methods, and may include, for example, any of a phone number, an email address, or a social security number, or a user name.

The request may originate from a client device 110 using request instructions provided from one or more third-party servers, for example, any of server(s) 120, 130, or 140. The profile ID may also be associated with an electronic loyalty program of a second party, such as a retailer who is offering a product or service associated with an electronic coupon. For example, the electronic coupon may be associated with a product or service, such as the Aveeno® skin care lotion product of FIG. 2, offered by the second party, where the electronic coupon 210 may be used by the first user to purchase the Aveeno® skin care lotion product at a discount from the second party. In the present embodiment, the second party may be a retailer who is associated with the electronic loyalty program, and in some embodiments, who hosts the loyalty server(s) 102.

At block 406, the request received by the loyalty server(s) 102 may cause the electronic coupon system to activate the electronic coupon for the loyalty profile of the first user. The electronic coupon may be provided by the same or separate third-party, including, for example, provided by a server associated with the same or separate third-party, to the client device for display on the client device. In some embodiments, the request instructions may cause the client device to access an application programming interface API of loyalty server(s) 102 in order to activate the electronic coupon.

In further embodiments, the loyalty server's API may expose a recommendation interface that is operable to transmit, across a computer network, one or more recommendations for electronic coupons. For example, as described herein, loyalty server(s) 102 may expose a Request Get Recommended Offers service that can fetch dynamically ranked sets of recommended offers for a given user. The recommendation interface may be used, for example, by other servers, such as DSP server(s) 120, digital media advertiser server(s) 130, or publisher server(s) 140, to provide recommendations for electronic coupons to display on a client device 110.

In various embodiments, the one or more third-party servers may include digital media advertiser server(s) 130 associated with a digital media advertiser, such as a wholesaler of a particular product or service. The one or more third-party servers may also include a demand side platform DSP server(s) 120 associated with a party offering demand side platform services, such as Google offering the DSP Google Ad services. The one or more third-party servers may also include a publisher server(s) 140 associated with a publisher party such as newspaper offering an online media or newspaper website, or other party operating a different consumer facing website.

As described herein, in certain embodiments, a digital media provider may create an electronic coupon, such as electronic coupon 210, and provide the electronic coupon to a DSP for further provision of the electronic coupon on the publisher server, and for ultimate display on a client device 110. In certain embodiments, the request instructions for activating an electronic coupon may be associated with the electronic coupon displayed on a client device 110. For example, in several embodiments, the request instructions and the electronic coupon may be provided from a digital media advertiser, such as a digital media advertiser server(s) 130, to DSP server(s) 120. In such embodiments, the publisher server(s) 140 can accesses the request instructions and electronic coupon from the DSP server(s) 120 and display, using display instructions, the electronic coupon on the client device 110 such that the request instructions would be available for use with the client device 110.

In another embodiment, the electronic coupon system, hosted, for example, on loyalty server(s) 102, may transmit a loyalty account status of the first user to the client device upon receiving the request, where the loyalty account status may indicate a number of accounts associated with the loyalty profile of the first user. The electronic coupon system may receive a detailed indication from the client device indicating a particular account of the loyalty profile to use for activation of the electronic coupon.

Figure 5:
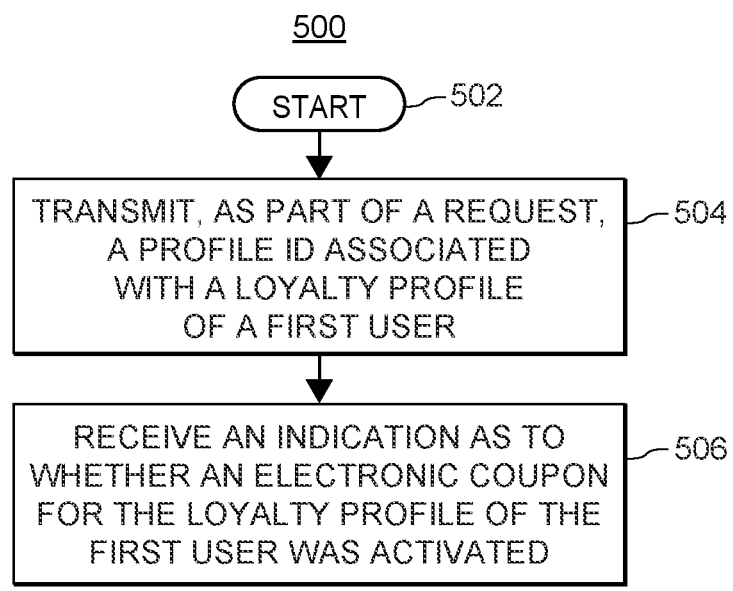
FIG. 5 illustrates a flow diagram of an exemplary method for receiving an indication of whether an electronic coupon has been activated via one or more third-party servers.

FIG. 5 illustrates a flow diagram of an exemplary method 500 for receiving an indication of whether an electronic coupon has been activated via one or more third-party servers. In one embodiment, method 500 may be executed by a client device 110 executing request instructions stored on a tangible, non-transitory computer-readable medium, such as one or more computer memories of the client device 110, where the client device 110 is in communication with loyalty server(s) 102.

Method 500 beings at block 504 where the client device 110, executing the request instructions, transmits to loyalty server(s) 102, as part of a request across a computer network 106, a profile identifier (ID) associated with a loyalty profile of a first user and also associated with an electronic loyalty program of a second party. As described herein, the profile ID may be any ID used to uniquely identify a user. The request may originate from the client device 110 using the request instructions, which may have been provided from one or more third-party servers.

At block 506, as a result of the request, the client device 110 may receive an indication from loyalty server(s) 102 as to whether an electronic coupon for the loyalty profile of the first user was activated. In some embodiments, the electronic coupon can be provided from the one or more third-party servers (e.g., server(s) 102, 120, 130, or 140) to the client device for display on the client device, as described herein.

In some embodiments, the request instructions may further include instructions for a client device 110 to request, across the computer network 106, a loyalty account status of the first user from loyalty server(s) 102, the loyalty account status indicating a number of accounts associated with the loyalty profile of the first user. The request instructions may also be operable to transmit a detailed indication from the client device 110 indicating a particular account of the loyalty profile to use for activation of the electronic coupon.

In still further embodiments, the request instructions may further include instructions for the client device 110 to receive a webpage, such as a webpage of the second party hosting the loyalty server(s) 102, that displays one or more activated electronic coupons for the first user.

Figure 6:
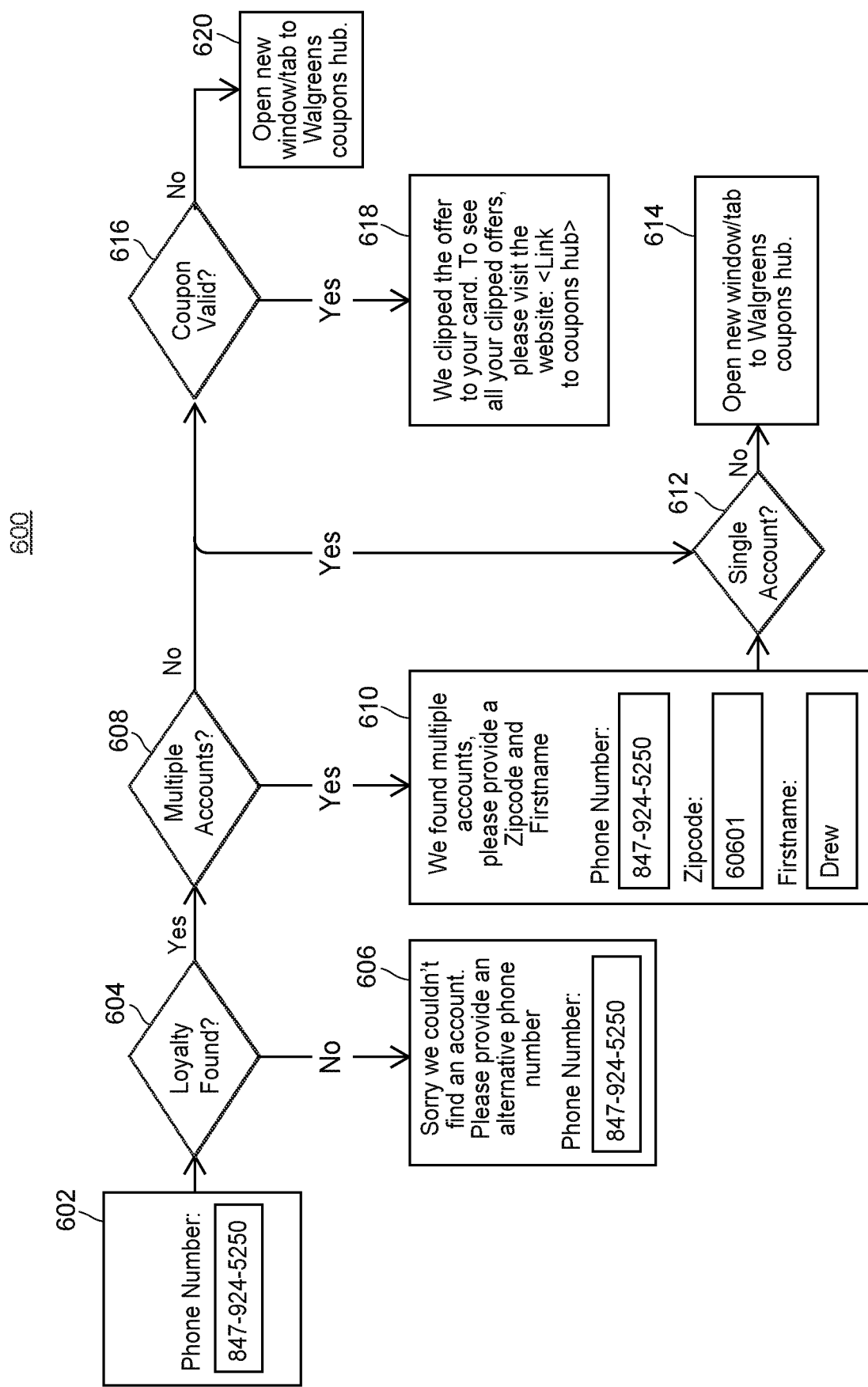
FIG. 6 illustrates a flow diagram of an exemplary method of a user activating an electronic coupon in accordance with the disclosed electronic coupon systems and methods.

FIG. 6 illustrates a flow diagram of an exemplary method 600 of a user activating an electronic coupon in accordance with the disclosed electronic coupon systems and methods. Block 602 includes a text box for the user to input a profile ID. Block 602 may correspond to input text box 306 of electronic coupon 210 as described for FIG. 3A herein. At block 602, the user may input his or her profile ID, which in the embodiment of FIG. 6, is the user's phone number (although other profile IDs may be used as disclosed herein). The user may select to "Clip" the electronic coupon, for example, electronic coupon 210, by selecting a submit button, such as the submit button 308 as disclosed for FIG. 3A herein. The selection of the submit button may cause a client device 110 to execute request instructions associated with the electronic coupon 210 to transmit a request, that includes the user's profile ID, to a server, such as loyalty server(s) 102, to activate the electronic 210 for the user's loyalty profile.

At block 604, the loyalty server(s) 102 may search stored loyalty profiles to identify the loyalty profile associated with the profile ID sent with the request.

At block 606, if the loyalty server(s) 102 cannot find a loyalty profile for the user's profile ID, then the loyalty server(s) 102 may respond with a message, as shown in block 606, indicating that a loyalty profile or account could not be found. The message may be displayed by the client device in the same area or tile of the webpage as the electronic coupon, and may provide an input textbox for the user to reenter his or her profile ID as shown for block 606. In an alternative embodiment, the message for block 606 may also display a link for the user to "sign up" with the loyalty program, which could allow a new user to activate an account with the loyalty program or allow an existing user to gain an additional loyalty account.

At block 608, if the loyalty server(s) 102 does find a loyalty profile associated with the user's profile ID, then the loyalty server(s) 102 determine whether there are multiple loyalty accounts available for the user's loyalty profile.

At block 610, in the even that multiple accounts are detected, then the loyalty server(s) 102 may respond with an input message, as shown in block 610, indicating that a multiple accounts for the user's loyalty profile have been found. The input message may correspond to the input message 320 as disclosed for FIG. 3C. The input message may be displayed by the client device in the same area or tile of the webpage as the electronic coupon, and may provide an input textboxes for the user to enter user specific information, including the user's phone number, zip code, and first name, as described herein for FIG. 3C. Once the user has input his or her specific information, the user may select the submit button causing the client to execute the request instructions sending the specific information to the loyalty server(s) 102.

At block 612, if a single loyalty account can be associated for the user based on the specific information, then the method proceeds to block 616. If a single loyalty account cannot be associated for the user based on the specific information, then the method proceeds to block 614, where the client device may redirect the client device to a different webpage, such as a retailer webpage associated with the electronic coupon, for example, in this embodiment, a webpage for Walgreens related to Walgreens' coupon hub webpage.

From either block 608 or block 612, in the event that single loyalty account for the user's profile ID is identified by loyalty server(s) 102, then loyalty server(s) 102 proceed to block 616 to determine whether the electronic coupon, such as electronic coupon 210, is valid. The validity of a coupon is determined by whether the coupon may be activated for the user's loyalty account. For example, in some embodiments, valid electronic coupons are those that are currently available (i.e., live) on the loyalty server 102, have not expired, and/or have not been already redeemed by the user.

At block 620, if the electronic coupon is not valid, then the method proceeds to block 620, where the client device may redirect the client device to a different webpage, such as a retailer webpage associated with the electronic coupon, for example, in this embodiment, a webpage for Walgreens related to Walgreens' coupon hub webpage.

In the event the coupon is valid, however, the method proceeds to block 618, where the loyalty server(s) 102 may transmit to client device 110 an indicator message indicating that the electronic coupon, such as coupon 210, has been successfully clipped to the user's loyalty profile, which can include, in some embodiments, a rewards card as indicated in block 618. The indicator message of block 618 may correspond to the indicator message 310 as described for FIG. 3D herein.

ADDITIONAL CONSIDERATIONS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. An electronic coupon system for activating electronic coupons via one or more third-party servers, the electronic coupon system comprising:
   a web-based application programming interface (API) exposed to a set of online request instructions, the set of online request instructions included as part of an electronic coupon configured for electronic transmission from one or more third-party servers of a third party, wherein the online request instructions comprise client-based code configured to run or execute on any number of operating systems or platforms of a client device, and further configured to directly access the exposed web-based API via a computer network;
   an API server hosted by a party different from the third party, and the API server implementing the web-based API to receive an activation request based on execution of the set of online request instructions by the client device; and
   a computer memory communicatively coupled to the API server, the memory storing a loyalty profile of a first user, the loyalty profile stored as part of a loyalty program of the party, wherein the API server is configured to activate an electronic coupon for the loyalty profile of the first user upon receipt of the activation request.

2. The electronic coupon system of claim 1, wherein the one or more third-party servers includes a digital media advertiser server, a demand side platform (DSP) server, and a publisher server, wherein the digital media advertiser server is associated with a digital media advertiser party, wherein the DSP server is associated with a demand side platform party, and wherein the publisher server is associated with a publisher party.

3. The electronic coupon system of claim 2, wherein the request instructions are associated with the electronic coupon, the request instructions and the electronic coupon provided from the digital media advertiser to the DSP server, and wherein the publisher server accesses the request instructions and electronic coupon from the DSP server and provides display instructions for displaying the electronic coupon on the client and for making available the request instructions on the client device.

4. The electronic coupon system of claim 3, wherein the request instructions cause the client device to access a loyalty server associated with the party in order to activate the electronic coupon.

5. The electronic coupon system of claim 4, wherein the loyalty server comprises a recommendation interface operable to transmit, across the computer network, one or more recommendations for electronic coupons.

6. The electronic coupon system of claim 1, further configured to:
   transmit a loyalty account status of the first user to the client device upon receiving the request, the loyalty account status indicating a number of accounts associated with the loyalty profile of the first user; and
   receive a detailed indication from the client device indicating a particular account of the loyalty profile to use for activation of the electronic coupon.

7. The electronic coupon system of claim 1, wherein a profile identifier (ID) is associated with the loyalty profile of the first user and is included as part of the request, and wherein the profile ID is any of the following: a phone number, an email address, or a social security number, or a user name.

8. The electronic coupon system of claim 1, wherein the electronic coupon is associated with a product or service offered by the party, wherein the electronic coupon may be used by the first user to purchase the product or the service at a discount.

9. An electronic coupon method for activating electronic coupons via one or more third-party servers, and using one or more processors, the method comprising:
   exposing a web-based application programming interface (API) to a set of online request instructions, the set of online request instructions included as part of an electronic coupon configured for electronic transmission from one or more third-party servers of a third party, wherein the online request instructions comprise client-based code configured to run or execute on any number of operating systems or platforms of a client device, and further configured to directly access the exposed web-based API via a computer network;
   implementing the web-based API on an API server hosted by a party different from the third party, and the API server configured to receive an activation request based on execution of the set of online request instructions by the client device;
   storing a loyalty profile of a first user in a computer memory, the computer memory communicatively coupled to the API server, the loyalty profile stored as part of a loyalty program of the party; and
   activating an electronic coupon for the loyalty profile of the first user upon receipt of the activation request.

10. The electronic coupon method of claim 9, wherein the one or more third-party servers includes a digital media advertiser server, a demand side platform (DSP) server, and a publisher server, wherein the digital media advertiser server is associated with a digital media advertiser party, wherein the DSP server is associated with a demand side platform party, and wherein the publisher server is associated with a publisher party.

11. The electronic coupon method of claim 10, wherein the request instructions are associated with the electronic coupon, the request instructions and the electronic coupon provided from the digital media advertiser to the DSP server, and wherein the publisher server accesses the request instructions and electronic coupon from the DSP server and provides display instructions for displaying the electronic coupon on the client and for making available the request instructions on the client device.

12. The electronic coupon method of claim 11, wherein the request instructions cause the client device to access a loyalty server associated with the party in order to activate the electronic coupon.

13. The electronic coupon method of claim 12, wherein comprises a recommendation interface operable to transmit, across the computer network, one or more recommendations for electronic coupons.

14. The electronic coupon method of claim 9, further comprising:
   transmitting a loyalty account status of the first user to the client device upon receiving the request, the loyalty account status indicating a number of accounts associated with the loyalty profile of the first user; and
   receiving a detailed indication from the client device indicating a particular account of the loyalty profile to use for activation of the electronic coupon.

15. The electronic coupon method of claim 9, wherein a profile identifier (ID) is associated with the loyalty profile of the first user and is included as part of the request, and wherein the profile ID is any of the following: a phone number, an email address, or a social security number, or a user name.

16. The electronic coupon method of claim 9, wherein the electronic coupon is associated with a product or service offered by the party, wherein the electronic coupon may be used by the first user to purchase the product or the service at a discount.

17. A tangible, non-transitory computer-readable medium storing request instructions for activating electronic coupons, when executed by one or more processors of a client device, cause the client device to:
   transmit a request across a computer network, the request originating from a client device of a first user, the request including a set of online request instructions provided from one or more third-party servers of a third party,
   wherein the set of online request instructions are included as part of an electronic coupon configured for electronic transmission from the one or more third-party servers of a third party,
   wherein the online request instructions comprise client-based code configured to run or execute on any number of operating systems or platforms of a client device, and further configured to directly access an exposed web-based Application Programming Interface (API), and
   wherein the set of online request instructions is transmitted to the exposed web-based API, the web-based API implemented on an API server hosted by a party different from the third party, the API server configured to receive an activation request based on execution of the set of online request instructions by the client device, and the API server communicatively coupled to a computer memory, the memory storing a loyalty profile of the first user as part of a loyalty program of the party, and wherein the API server is configured to activate an electronic coupon for the loyalty profile of the first user upon receipt of the activation request.

18. The tangible, non-transitory computer-readable medium of claim 17, wherein the non-transitory computer-readable medium further includes request instructions that, when executed by the one or more processors of the client device, cause the client device to:

request, across the computer network, a loyalty account status of the first user from a loyalty server of the party, the loyalty account status indicating a number of accounts associated with the loyalty profile of the first user; and transmit a detailed indication from the client device indicating a particular account of the loyalty profile to use for activation of the electronic coupon.

19. The tangible, non-transitory computer-readable medium of claim 18, wherein the detailed indication includes at least a phone number, a zip code, and a first name associated with the first user.

20. The tangible, non-transitory computer-readable medium of claim 17, wherein the non-transitory computer-readable medium further includes request instructions that, when executed by the one or more processors of the client device, cause the client device to receive a webpage displaying one or more activated electronic coupons for the first user.

\* \* \* \* \*